Sept. 24, 1968

J. T. MAYNARD 3,402,565

PRESSURE RESPONSIVE REFRIGERATION MOTOR CONTROL

Filed July 26, 1966

INVENTOR.
John T. Maynard
BY
MERL E. SCEALES

ATTORNEY

3,402,565
PRESSURE RESPONSIVE REFRIGERATION MOTOR CONTROL

John T. Maynard, New Berlin, Wis., assignor to A. O. Smith Corporation, Milwaukee, Wis., a corporation of New York
Filed July 26, 1966, Ser. No. 567,904
5 Claims. (Cl. 62—183)

ABSTRACT OF THE DISCLOSURE

The present disclosure relates to controlling the connection of a condenser motor to a power supply by selectively firing of a controlled rectifier means. A pulse forming circuit includes a resistor having a movable tap, the setting of which controls the pulse repetition rate.

Figure 1:
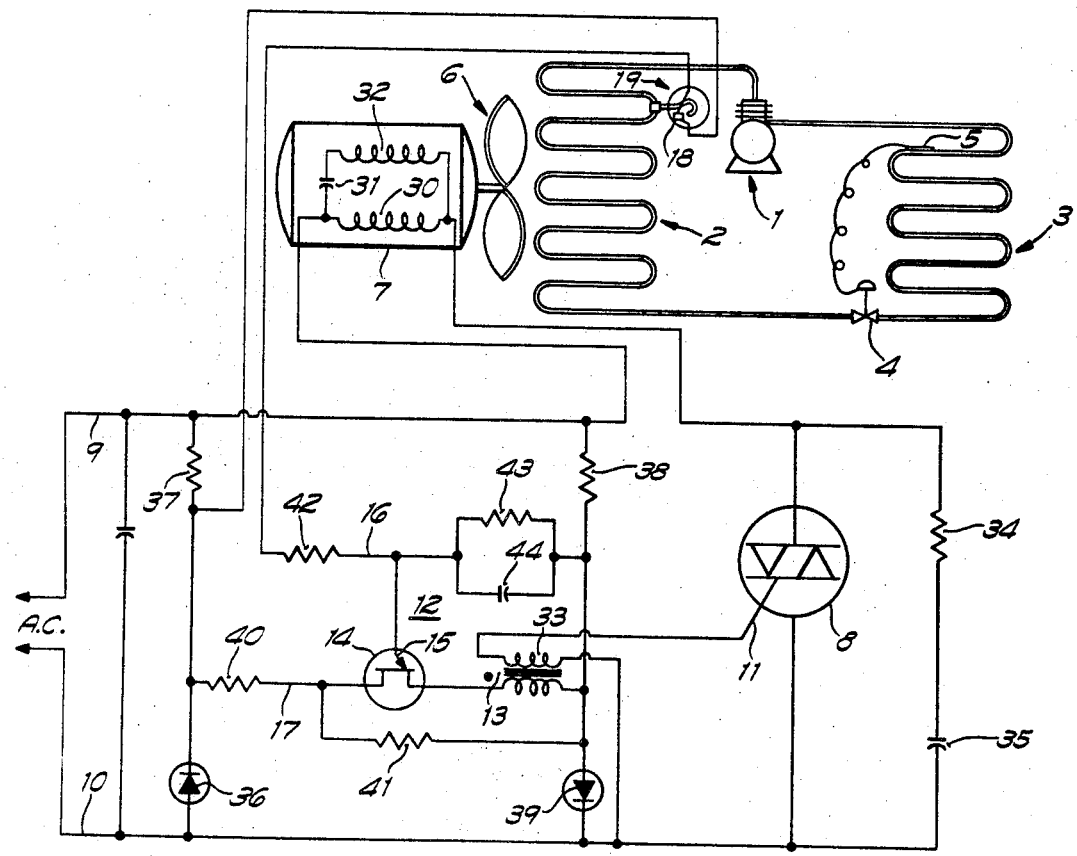

A Bourdon tube is connected directly to the condenser coil and to the movable tap by an insulating coupling member. The Bourdon tube is a pressure transducer which provides immediate response in the pulse forming circuit.

---

This invention relates to a pressure responsive motor control and particularly to such a motor control for refrigeration motors and the like.

In air conditioning and refrigeration control systems, it may be desirable to vary the speed of an alternating current motor driving an air fan for various reasons.

United States Patent 3,196,629 discloses a refrigeration system employing an air cooled condenser. The speed of the fan motor is varied to control the air flow in accordance with the variation in the resistance of a temperature sensitive resistor clamped to a condenser coil to vary with condenser temperature. The pressure in the condenser is preferably maintained to prevent a reduction in the capacity of the system. The pressure and temperature are related and thus by sensing the temperature, a pressure related signal is obtained. A unijunction firing circuit includes the resistor connected to vary the time a firing pulse is generated in accordance with the sensed temperature. A silicon controlled rectifier has its gate connected to receive the firing pulse and is connected to control the voltage application to an alternating current fan motor and thereby control the air passed over a condenser.

The sensing of the temperature results in a time lag in response due to the time required for transmission of temperature through the condenser coil wall. Pressure sensitive bellows have been suggested to vary the resistance of a strain gauge and the like to avoid such problems. The output signal is quite small and therefore requires amplification. Further, good sensitivity and repeatability is difficult to obtain in a practical construction.

The present invention is particularly directed to an improved sensing system for controlling a motor in such a refrigeration system and the like wherein immediate and stable response is provided with changes in temperature conditions.

Generally, in accordance with the present invention, the motor is connected to a power supply by a controlled rectifier means and a firing circuit is provided having a variable resistor which determines the time of firing. The resistor includes a movable tap which is connected to the output of a pressure transducer connected directly in the refrigeration flow line.

The pressure transducer in accordance with one aspect of the present invention is a Bourdon tube connected directly to the condenser coil. A tapped resistor includes a movable tap secured to the outer end of the Bourdon tube for positioning in accordance with the sensed pressure.

The pressure transducer provides immediate response in the motor control in contrast to temperature sensing systems which encounter a thermal time lag between pressure changes and transmission of corresponding temperature changes.

The pressure transducer-variable resistor combination can also handle relatively large amounts of power compared with thermistor pressure transducers and thus avoids amplification requirements.

The present invention has been found to provide a highly reliable and stable response to changes in temperature as reflected in pressure changes in a refrigeration system for controlling an alternating current motor.

The drawing furnished herewith illustrates a preferred construction of the present invention in which the above advantages and features are clearly disclosed.

Figure 2:
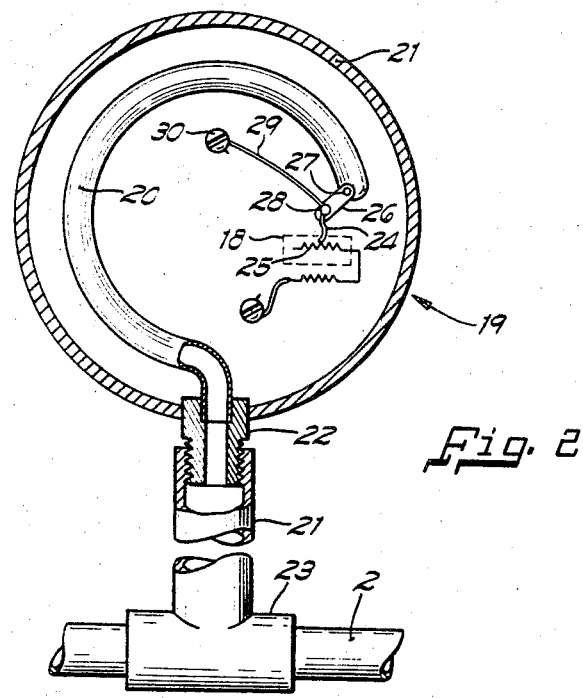

In the drawing:

FIG. 1 is a schematic circuit diagram of a pressure responsive control for a split capacitor run motor applied to a refrigeration system of the type employing an air cooled condenser; and FIG. 2 is an enlarged view of a Bourdon tube electro-pneumatic transducer shown in FIG. 1.

Referring to the drawing, the present invention is shown in FIG. 1 applied to a known refrigeration condenser system as also shown in applicant's copending application entitled Condition Responsive Motor Control filed on Oct. 22, 1965, Ser. No. 500,966 and assigned to the same assignee as this application. The system includes a compressor 1 for producing flow of a suitable refrigerant through an air cooled condenser 2 and a refrigerant evaporator 3. The refrigerant flow through the system is controlled by a suitable thermal expansion valve 4 in the outlet of the evaporator 3 which may be regulated by a suitable temperature sensing device 5 connected to the evaporator. A fan 6 is mounted to pass air over the condenser 2 for condensing the refrigerant therein. The fan 6 includes an alternating current motor 7 which is preferably of the permanent split capacitor variety and consequently the winding for such a motor is diagrammatically shown. With proper design, the speed of a permanent split capacitor motor is directly proportional to the energization voltage supplied to the motor over most of the speed range. Consequently, by varying the portion or period of each positive and negative half cycle of the applied current, the speed of the motor can be accurately controlled.

As in applicant's above copending application, a triggered symmetrical switch 8 is connected in series with the motor 7 to the incoming alternating current power lines 9 and 10. The switch 8 is shown as a bidirectional controlled rectifier having a single gate 11 operative to fire the rectifier to conduct with the voltage applied across the main terminals with either polarity. A firing circuit 12 is connected to the trigger gate 11 of the switch 8 through a pulse transformer 13.

The firing circuit includes a unijunction transistor 14 connected to the A.C. power lines 9 and 10 through a rectifying circuit. The unijunction transistor 14 is also a triggered device having a control emitter 15 connected to the power lines through a trigger branch 16 connected in parallel with the base branch 17 of the unijunction transistor which includes the pulse transformer. A pressure controlled resistor unit 18 is connected in the trigger branch 16. A pressure transducer 19 is connected to the condenser coil or the like and provides a mechanical output coupled to unit 18 to provide a variation in the resistance of the trigger circuit in accordance with pressure changes in the condenser 2. In this manner, the precise firing point of the unijunction transistor 14 is controlled and it in turn controls the firing of the symmetrical switch 8.

The pressure transducer 19 is more clearly shown in FIG. 2 and includes a Bourdon tube 20 mounted within a suitable housing 21. The inlet end of the tube 20 is connected to a signal line 21 by a suitable connector 22. The opposite end of the signal line 22 is tapped to the condenser coil 2 by a suitable connector 23.

The Bourdon tube 20 is the usual flattened metal tube, normally of brass, closed at the outer end and bent into a generally circular configuration. Pressure within the tube 20 causes it to straighten slightly and provide a mechanical movement of the outer end.

The resistor unit 18 is mounted within the housing 21 adjacent the free end of the Bourdon tube 20 and includes a movable tap 24 on a resistor 25. An electrically insulating coupler member 26 is fixed to the free end of the Bourdon tube 20 as at 27 and to the movable tap 24 as at 28. Tap 24 is shown as a leaf spring member to maintain contact with resistor 25 as the outer end of the Bourdon tube 20 moves through a slight arc. In practice, any desired construction can be employed. The tap 24 is therefore selectively positioned on the resistor 25 in accordance with the flexed position of the Bourdon tube. A lead 29 is connected to tap 24 and to a terminal 30 for connection in circuit 12, as hereinafter described.

In the illustrated embodiment of the invention, the split capacitor motor 7 is shown with the main running winding 31 connected in series with the power lines 9 and 10 and the symmetrical switch 8. The starting capacitor 31 and starting winding 32 are series connected in parallel with the main winding.

The symmetrical switch 8 serves the function of back-to-back silicon controlled rectifiers or the like in that it is adapted to conduct during both the positive half cycle and the negative half cycle of the alternating current power if an input signal or current is applied to the single trigger electrode 11. The pulse transformer 13 which is energized by the branch 17 of circuit 12 has a secondary or output winding 33 connected in circuit to the trigger electrode 11 to fire switch 8. Once the symmetrical switch 8 is fired to initiate conduction through the switch, conduction continues for the corresponding half cycle until the current drops to zero and reverses, which allows the symmetrical switch 8 to regain its blocking state. Switch 8 does not again conduct until another firing pulse is applied to the gate 11.

A stabilizing resistor 34 and a capacitor 35 are series connected directly across the symmetrical switch 8.

The firing circuit 12 is connected to the power lines 9 and 10 as follows.

A diode 36 in series with a resistor 37 is connected directly across the power lines 9 and 10 and polarized to conduct in one direction; shown from line 10 to 9. A similar resistor 38 is connected in series with a similar diode 39 across the lines with the diode 39 polarized to conduct in the opposite direction to provide a direct current potential between the center junction of the two branches.

The unijunction transistor 14 is a conventional well known device and is schematically illustrated with base or main electrodes connected to the junction of the diode 36 and the resistor 37 in series with a resistor 40 and to the junction of the resistor 38 and diode 39 in series with transformer 13. Each full half cycle of the incoming power is applied directly across the base circuit unijunction transistor 14 with the power path being unidirectionally directed through the unijunction transistor as a result of the diodes 36 and 39.

A stabilizing resistor 41 is connected in series with the resistor 40 and in parallel with the interbase circuit of unijunction transistor 14 in series with the primary of the pulsing transformer 13.

Generally, the trigger branch 16 includes the variable resistor 25 of unit 18 having one end connected directly to the junction of resistor 37 and diode 36 and the opposite end connected in series with a resistor 42 and the parallel combination of a resistor 43 and a timing capacitor 44 to the junction of resistor 38 and diode 39. The emitter 15 is connected to the junction between the resistor 42 and the paralleled resistor 43 and capacitor 44. In operation, the pulsating voltage applied across the interbase branch 17 is simultaneously applied across the trigger branch 16. An in-phase pulsating voltage is therefore impressed upon both the trigger branch and the base branch. The current in the trigger branch 16 charges the capacitor 44 and impresses an increasing voltage on the emitter 15. The tap 24 on the resistor 25 is positioned by flexure of the Bourdon tube 20 to establish a resistance proportional to the pressure condition in the condenser 2. The resistance value of resistor 24 varies the time constant of the trigger branch circuit. The time that the capacitor 44 charges to the firing point of the unijunction transistor 14 in each half cycle therefore varies with the setting of resistor 18 and therefore the condenser pressure sensed by the Bourdon tube.

The operation of the illustrated embodiment of the invention is summarized as follows.

The circuit is designed to provide a selected adjustment of the resistor 25 for a corresponding controlled pressure range which affects the predetermined variation in the speed of the motor. In operation, the transducer 19 may be selected for example to have a set point pressure holding the resistor 25 at a value to apply 95 percent of full load voltage to the motor 7.

With the resistor 18 at the set pressure, the resistance of the firing circuit is such that the capacitor 44 will charge to a proper firing point to fire the unijunction transistor 14 which in turn through the pulse transformer 13 applies a pulse to the gate 11 of the symmetrical triggered switch 8 to apply 95 percent of the line voltage to the motor 7. The circuit will continue to fire at essentially the same angle during each half cycle to maintain application of the corresponding half cycles as long as the resistor 18 is maintained at that temperature.

If the pressure in condenser 2 varies, the Bourdon tube 20 is flexed accordingly and adjusts the setting of resistor tap 24. If the pressure increases, the tap 24 is moved to decrease the portion of resistor 25 inserted in the circuit. This reduces the time constant of the timing circuit and consequently, the firing point is reached earlier in the cycle to fire the unijunction transistor 14 and the switch 8 and apply a greater portion of the applied current to the motor 7 and thereby increase the speed of the motor 7. This will increase the cooling effect to return the pressure condition to the desired set point. Conversely, if the temperature decreases, the Bourdon tube 20 flexes and adjusts the setting of resistor tap 24 to increase the resistance and time constant, retard the firing point and thereby reduce the proportion of the voltage and current applied to the motor 7. This in turn reduces the speed of the motor to allow the pressure to increase to the set point condition.

Control circuit 12 may be nonlinear. By employing a potentiometer unit 18, the resistor 25 may be wound to provide a desirable nonlinear response to more closely match a particular circuit response, if desired.

The present invention provides an improved motor control network for refrigeration systems and the like having means to provide improved rapid response to changes in temperature conditions.

Various modes of carrying out the invention are contemplated as being within the scope of the following claims particularly pointing out and distinctly claiming the subject matter which is regarded as the invention.

I claim:

1. In a refrigeration system including a refrigerant condenser and a variable speed alternating current motor connected to drive a fan to pass air over the condenser, the improvement in the means to energize the motor comprising, a source of alternating current, a phase controlled switch means connected to control the power supplied to the motor during each half cycle of the alternating current and having an operating means for turning on of said switch means, a pressure sensitive transducer connected to said condenser and providing a mechanical movement in accordance with the condenser pressure, a variable resistance means having a movable contact member coupled to the transducer and positioned in accordance with said mechanical movement, and circuit means connected to the operating means and including said resistance means connected to periodically actuate said switch means during each half cycle of the alternating current in accordance with the pressure in said condenser and thereby control the power supplied to the motor.

2. The improvement defined in claim 1 wherein said pressure sensitive transducer is a Bourdon tube.

3. The refrigeration system of claim 1 wherein said resistance means is a condenser and a variable speed motor connected to drive a fan to pass air over the condenser, the improvement in the means to energize the motor comprising, switch means connected to control the effctive power supplied to the motor and having an operating means, a Bourdon tube having an inlet end connected to the condenser and an outer closed end positioned in proportion to the pressure at the inlet end, a fixed resistor having a movable tap, an insulating coupling is connected to the tap and to said pressure transducer to position the tap on the resistor in accordance with the condenser pressure, and said circuit including said resistor and tap to actuate said switch means.

4. The refrigeration system of claim 1 wherein said resistance means is a fixed resistor having a movable tap, means connecting said movable tap to the pressure transducer and being positioned in accordance with the condenser pressure, and said circuit means including a pulse forming mean forming a train of time spaced pulses and havin said resistor and tap connected therein to determin the repetition rate of the pulses in said train and having means connected to apply said pulse train t said switch means to control the particular period o time in each half cycle that the alternating curren is supplied to the motor.

5. The refrigeration system of claim 1 wherein th phase controlled switch means is a bidirectional conduct ing rectifying means having a gate means for firing o the rectifying means to conduct during either half cycl of the alternating current and said resistance means is fixed resistor having a movable tap, means connecting said movable tap to the pressure transducer and being positioned in accordance with the condenser pressure, and said circuit means including a pulse forming means connected to said gate means, said pulse forming means forming a train of equally spaced pulses and having said resistor and tap connected therein to determine the repetition rate of the pulses in said train and having means connected to apply said pulse train to said gate means to control the particular period of time in each half cycle that the alternating current is supplied to the motor.

References Cited
UNITED STATES PATENTS 2,705,404    4/1955    Malutich _____ 62—184
2,952,991    9/1960    St. Pierre.

MEYER PERLIN, *Primary Examiner.*